United States Patent [19]

Csajka et al.

[11] 4,077,021

[45] Feb. 28, 1978

[54] METHOD AND ARRANGEMENT FOR CODING BINARY SIGNALS AND MODULATING A CARRIER SIGNAL

[75] Inventors: Istvan Peter Csajka, Mahopac, N.Y.; Gottfried Ungerboeck, Adliswil, Switzerland

[73] Assignee: International Business Machines Corporation, Armonk, N.Y.

[21] Appl. No.: 799,405

[22] Filed: May 23, 1977

[30] Foreign Application Priority Data

Jun. 18, 1976 Switzerland .................... 7800/76

[51] Int. Cl.² ................. H04L 27/12; H04L 27/20
[52] U.S. Cl. .............................. 332/9 R; 178/66 A; 325/163; 332/16 R; 340/347 DD
[58] Field of Search ............... 332/9 R, 16 R, 21, 42; 178/66 A, 66 R; 325/161, 163; 340/347 DD

[56] References Cited

U.S. PATENT DOCUMENTS

| | | | |
|---|---|---|---|
| 3,505,470 | 4/1970 | Gorog | 178/66 R |
| 3,747,024 | 7/1973 | Choquet et al. | 332/9 R |

*Primary Examiner*—Siegfried H. Grimm
*Attorney, Agent, or Firm*—John B. Frisone

[57] ABSTRACT

A method and structure for converting a sequence of binary digits into a sequence of discrete signal values, e.g., phase values, of a modulated carrier signal for data transmission. By introducing additional redundant signal values and coding information in a state-dependent sequential manner, enlarged minimum Euclidian distance between possible signal value sequences is achieved which results in a reduced error probability when maximum-likelihood decoding is applied in the receiver.

4 Claims, 11 Drawing Figures

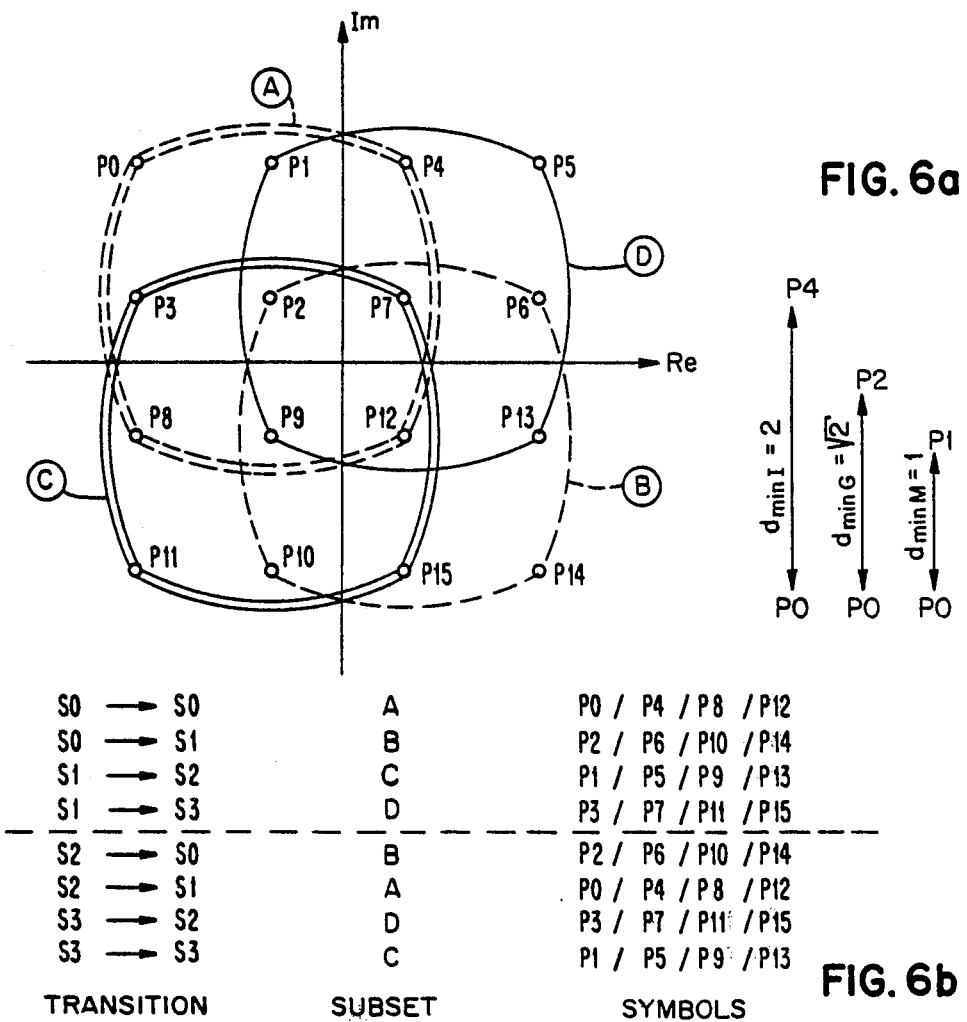
FIG. 6a
FIG. 6b
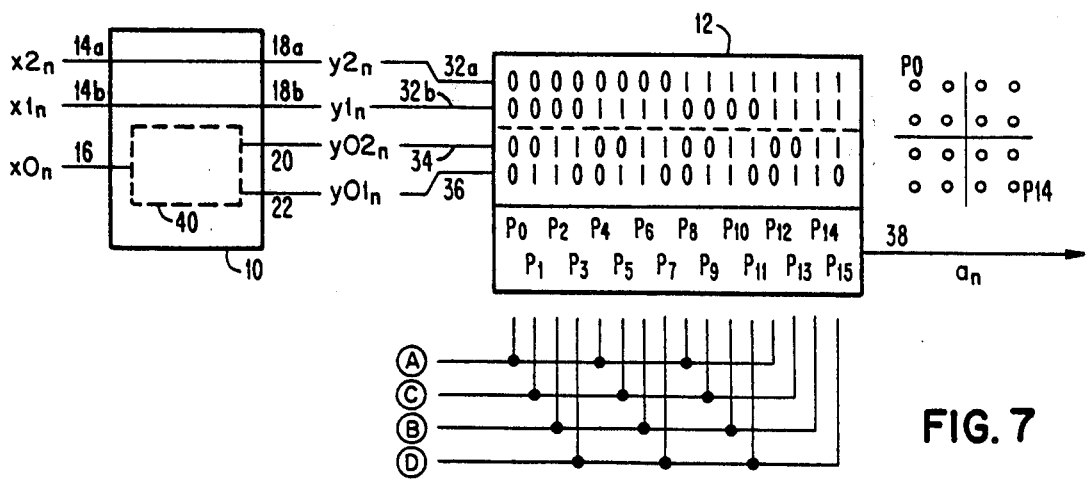
FIG. 7

METHOD AND ARRANGEMENT FOR CODING BINARY SIGNALS AND MODULATING A CARRIER SIGNAL

BACKGROUND OF THE INVENTION

The present invention is concerned with a method for transmitting a bit sequence by modulation of a carrier signal with discrete signal values, and an arrangement for executing this method.

SUMMARY OF THE INVENTION

For synchronous transmission of digital data over a channel, a carrier signal can be so modulated that it assumes at each of discrete, equidistant sampling times one signal value from a given number of discrete signal values. These discrete values can be taken from a real-valued (amplitude modulation) or from a complex-valued (amplitude and phase modulation) set of channel symbols. One bit can be transmitted per sampling interval if two discrete channel symbols (signal values) are allowed. For the transmission of $n$ bits per sampling interval, $2^n$ different discrete values are normally required.

Hence, the larger the number of available discrete channel symbols, the more information can be transmitted per unit time. The recognition of transmitted channel symbols in the receiver, assuming a given signal power, becomes more difficult as the number values increase because these values are spaced more closely and an amplitude or phase error caused by superimposed disturbances is more likely to result in a decision error. Therefore, with a given signal-to-noise ratio the error probability is increased if the number of discrete carrier signal values is increased.

A compromise must be found between the amount of information that is transmitted per unit time and the corresponding error event probability.

A decrease in error probability may be achieved by using sequence coding with certain restrictions on the permitted sequences of channel symbols. The rules followed in the coding process introduce a redundancy which during the subsequent sequential decoding process, facilitates determining from a sequence of disturbed channel symbols the channel symbol sequence which was most likely transmitted. Thereby, a significant reduction in error probability can be achieved. Examples are described in the articles, "Viterbi Decoding for Satellite and Space Communication," by J. A. Heller et al., published in IEEE Trans. Comm. Tech., Vol. COM - 19 (1971), pp. 835-848, and "The Viterbi Algorithm" by G. D. Forney, published in Proc. IEEE, Vol. 61 (1973), pp. 263-278. The known methods provide an improvement in the case of purely binary coding and transmission. They did not consider, however, the particular conditions which exist for non-binary transmission.

OBJECTS OF THE INVENTION

It is an object of the invention to devise a method of coding and modulation for carrier signal data transmission which, for a given signal-to-noise ratio and a given information transmission rate, results in an improved error event probability as compared to known methods.

It is a further object of the invention to devise an arrangement of a simple design for executing this method.

In accordance with the present invention a method is provided for transmission of a bit sequence by modulating a carrier signal to assume discrete signal values, characterized in that the bit sequence is subdivided into groups each consisting of $r$ bits, and that each $r$-bit group is expanded by a sequential coder having four internal states, into a group of $r + 1$ bits, and that in response to each $(r + 1)$ bit group the carrier signal is modulated to assume one out of $2^{r+1}$ discrete carrier signal values, the assignment between expanded bit groups and carrier signal values being so selected that $2^{r-1}$ carrier signal values correspond to each transition from one internal state of the coder to one of two possible follower states, and that these $2^{r-1}$ carrier signal values have a larger minimum distance from each other than the absolute minimum distance within the set of $2^r$ discrete signal values used in conventional nonredundantly coded transmission.

Further provided is an arrangement for implementing this method, comprising a coder/modulator which is characterized by:

input terminals for receiving successive $r$-bit groups of the bit sequence to be transmitted, each bit group comprising bits $x0_n$ and $x1_n \ldots x(r-1)_n$;

sequential coding means for receiving a predetermined bit ($x0_n$) of each bit group and for furnishing a coded bit pair according to the relation:

$$y02_n = x0_n \oplus x0_{n-2}$$

$$y01_n = x0_n \oplus x0_{n-1} \oplus x0_{n-2};$$

modulating means for modulating a carrier signal to assume one of $2^{r+1}$ discrete signal values in response to each coded bit pair $y01_n$, $y02_n$ and to the remaining bits $x1_n, x2_n \ldots x(r-1)_n$ of the respective bit group;

the discrete signal values having given distances from each other such that the complete set of signal values can be subdivided into two pairs of subsets (A, B and C, D) in which:

$$d_{min\ I} > d_{min\ G} > d_{min\ M}$$

with $d_{min\ I}$ = minimum distance of signal values within a given subset, $d_{min\ G}$ = minimum distance of signal values within a pair of subsets, and $d_{min\ M}$ = minimum distance of signal values within the complete set;

the connections in the combination of coder and modulator being so arranged that the coded bit pair selects the subset of signal values, and the remaining bits of a bit group select the assigned signal value within the selected subset.

The advantage which can be achieved by the invention is either a possible reduction of the energy of the data transmission signals because of the reduced error event probability at a given signal-to-noise ratio, or alternatively the ability to transmit at a given signal power despite a degradation in the disturbance conditions in the channel.

This is due to the fact that the minimum possible Euclidian distance between allowed sequences of signal values is larger than in the corresponding non-redundantly coded transmission, so that by a soft Viterbi-decoding operation in the receiver a safer determination of the transmitted signal values can be made from the received signal values. In such a sequential decoding operation the most likely sent sequence of channel symbols is determined directly from the non-quantized signal sample values.

BRIEF DESCRIPTION OF THE DRAWINGS

In the drawings:

FIG. 6a is a diagram of the values for a 16-QAM system and the subsets into which they are divided according to the invention, as well as the resulting minimum Euclidian distances;

FIG. 6b illustrates the assignments, according to the invention, of the QAM-values or subsets to the possible state transitions shown in the diagram of FIG. 3;

FIG. 7 is a block diagram of a coder/modulator for 3-bit 16-QAM modulation according to the assignments as shown in FIG. 6a and 6b;

FIG. 1 shows in a schematic representation the functional structure of a coder and modulator in which the present invention is embodied. The principle of the coder as well as of the modulator is known. Coding unit 10 is a sequential coder which furnishes a redundant information symbol $y_n$, e.g., a 3-bit group, in response to an information symbol $x_n$, e.g., a 2-bit group which is applied to the input, and to the internal state $S_{n-1}$ which is stored in block D. Thereafter the coder assumes state $S_n$. The internal state $S_n$ of the coder depends on a given number of previously received information symbols $x_n$, $x_{n-1}$, and so on.

Each symbol $y_n$ is converted by modulator 12 into an assigned amplitude and/or phase value of a carrier signal, which represents a channel symbol $a_n$.

Figure 1:
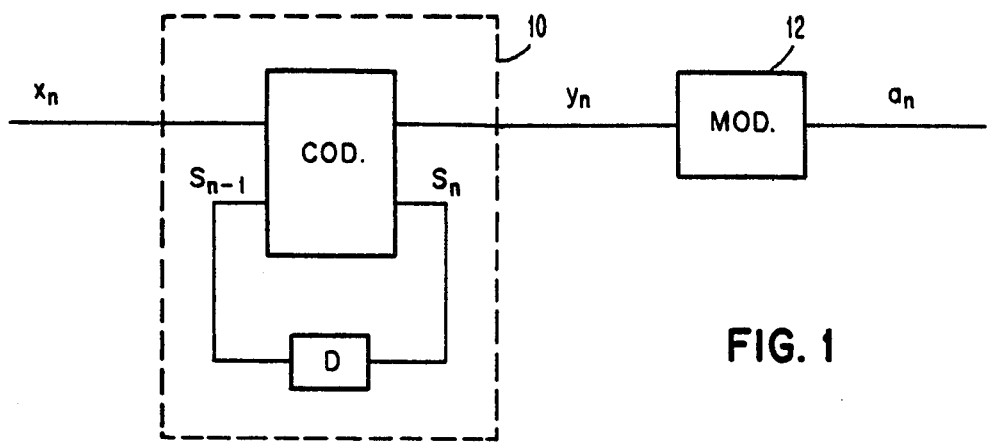
FIG. 1 is a block diagram of the basic functions of a coder/modulator in which the invention is implemented.
Figure 2A:
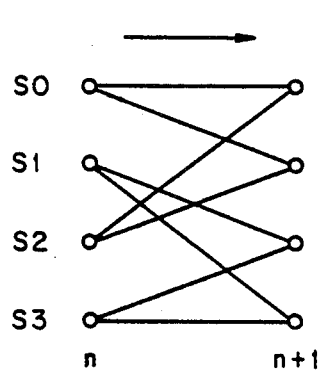
FIGS. 2a and b are diagrams illustrating the possible transitions between the states of the sequential coder of FIG. 1.
Figure 2B:
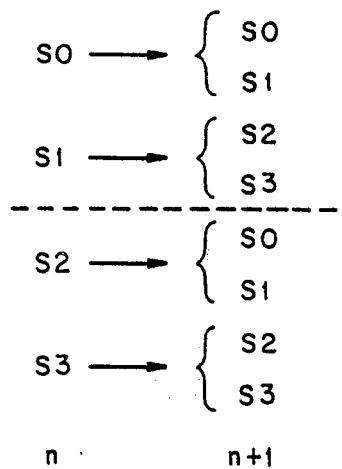
Figure 3:
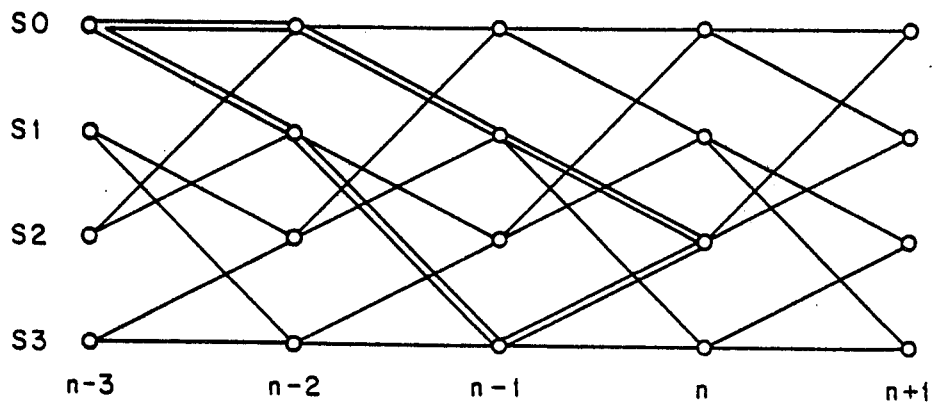
FIG. 3 is a diagram showing the sequentially possible state transitions of the sequential coder including the comparison of two paths.

FIGS. 2a, 2b and 3 show the basic relations that enable, by limiting the set of allowed transitions between a fixed number of internal states of the coder, a sequential decoding operation according to the principle of "maximum likelihood." The principles of this kind of coding are described extensively in the two above cited articles. Therefore, they will be explained here only briefly.

Figure 5:
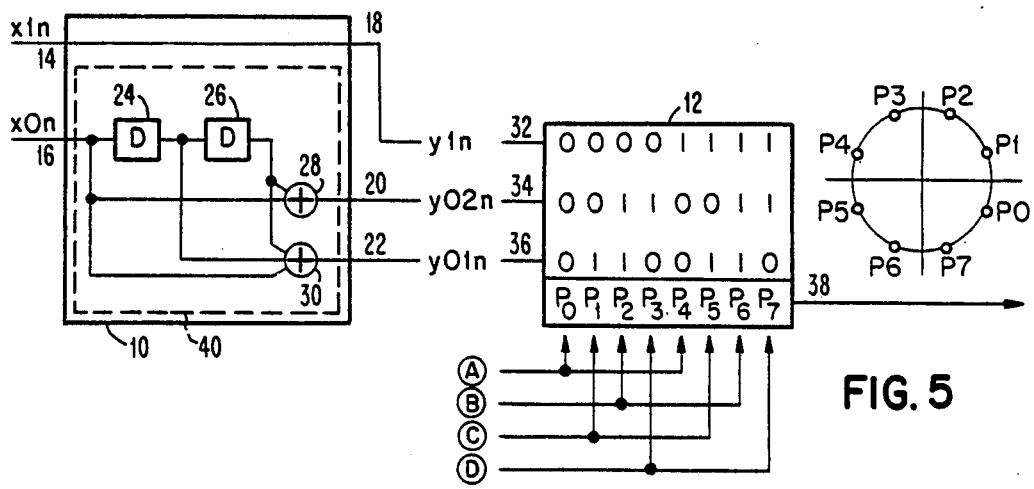
FIG. 5 is a block diagram of a coder/modulator for 2-bit 8-PSK modulation according to the assignments as shown in FIGS. 4a and 4b.

For the diagram of FIG. 2a it is assumed that the coder has four internal states S0 through S3 (this can, e.g., be represented by 2 bits stored in a shift register as will be shown in connection with FIG. 5). It has been further assumed that from each state a transition is possible only to two assigned follower states, e.g., from S0 to S0 or to S1, and from S1 to S2 or to S3. FIG. 2b shows all eight possibilities in list form.

Due to this restriction only certain sequences of states are possible as is shown in the so-called Trellis diagram of FIG. 3. The "allowed" paths starting from one state can only rejoin after at least three intervals (they have a certain minimum distance). The "Viterbi-decoding" operation which is described in the above mentioned articles permits one to determine in the receiver, from a sequence of signal sample values, the sequence of channel symbols which is on the one hand closest to this received sequence, but which on the other hand is in accordance with the coding law given by the Trellis diagram (i.e., the sequence which was most likely sent).

The present invention suggests combining the sequential coding and modulating operations, i.e., conversion into discrete carrier signal values, and associating each allowed transition in a four-state coder to a plurality of channel symbols (discrete carrier signal values) in such a way, that the allowed channel symbol sequences distinguish as much as possible in the sense of a Euclidian distance. The Euclidian distance between two complex channel symbols is the geometric or spatial distance which they have from each other as points in two-dimensional space. A sequence of $n$ channel symbols can be represented as a point in a 2 n-dimensional space and thus the Euclidian distance between channel symbol sequences is defined. The larger the Euclidian distance the lower the probability that one channel symbol sequence is mistaken for another channel symbol sequence due to channel disturbances.

A first embodiment of the invention will now be explained in connection with FIGS. 4a, 4b and FIG. 5. In this embodiment a bit stream is subdivided for transmission into 2-bit groups, and for each 2-bit group one of eight possible phase values or a carrier signal is transmitted (8-PSK, phase shift keying).

Figure 4A:
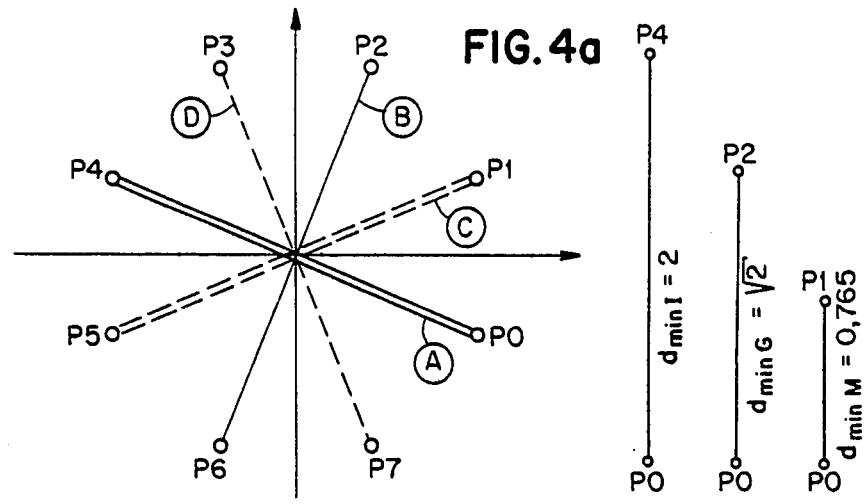
FIG. 4a is a diagram of the values for an 8-PSK system and the subsets into which they are divided according to the invention, and the resulting minimum Euclidian distances.

In FIG. 4a the eight phase values P0 through P7 are schematically shown in a diagram. They are combined in pairs to form subsets. The combination is indicated by a line (single or double, respectively, and solid or dashed, respectively). The subsets carry the designations A, B, C and D. The subsets in turn are combined in pairs to form groups (solid line on the one hand, and dashed line on the other hand). Subsets A and B, including values P0, P4, P2 and P6 belong to one group; subsets C and D, including values P1, P5, P3 and P7, belong to the other group.

Assuming that the values in the representation of FIG. 4a are located on a unit circle, the following is valid for the Euclidian minimal distances:

within each subset the minimum distance $d_{min\,I} = 2$ (e.g., P0–P4);

within each group the minimum distance $d_{min\,G} = \sqrt{2}$ (e.g., P0–P2); and between any values of the whole set the minimum distance is $d_{min\,M} = 2 \sin(\pi/8) = 0.765$ (e.g., P0–P1).

Figure 4B:
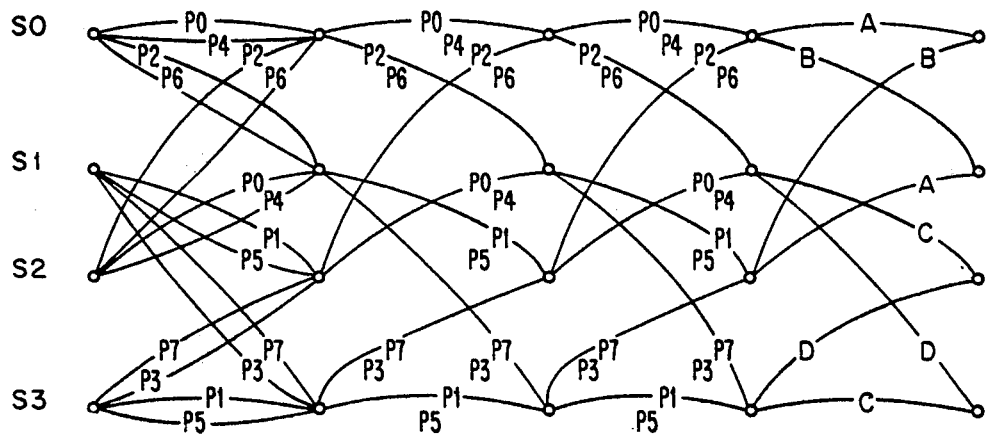
FIG. 4b illustrates the assignments, according to the invention, of the phase values or subsets of FIG. 4a to the possible state transitions shown in the diagram of FIG. 3.

FIG. 4b shows the time diagram for a sequential coder having four internal states and selected transitions, in which to each transition the two phase values (of a total of eight possible phase values) belonging to one subset are assigned. The two transitions which are possible from each state are assigned to the two subsets of one group each. These associations are clearly illustrated in FIG. 4b. Thus, two phase values can be associated with the transition from one state to the follower state. They have, however, a relatively large Euclidian distance from each other, i.e., $d_{min\ I} = 2$. Four phase values can be associated with the two possible transitions from one state. These have at least a Euclidian distance from each other which is larger than the smallest possible distance: $d_{min\ G} = \sqrt{2}$. Phase values which have the absolutely smallest possible Euclidian distance from each other (e.g. P0–P1) are never associated with a transition from (or to) one and the same state of the coder.

FIG. 5 shows in block form the coder/modulator for the first embodiment of the invention. The coder has two inputs 14 and 16 and three outputs 18, 20, and 22 for binary values. Between input 16 and output 20 and 22 a convolutional rate ½ coder 40 is arranged which per se is known, and which consists of two delay or storage elements (D) 24 and 26 and two exclusive OR gates or modulo-2-adders 28 and 30. These elements are connected in a known manner as shown in the drawing. Input 14 is directly connected to output 18.

This coder can assume four different internal states due to the two stored bits. The possible transitions correspond to the diagrams of FIGS. 2 and 4. The following functions are valid for the input and output binary values:

$$y1_n = x1_n$$

$$y02_n = x0_n \oplus x0_{n-2}$$

$$y01_n = x0_n \oplus x0_{n-1} \oplus x0_{n-2}$$

The 3-bit groups obtained by the sequential coding operation are furnished to the three input terminals 32, 34 and 36 of modulator 12. This modulator provides at its output 38 a carrier signal which has one of eight possible phase values P0 ... P7 depending on the 3-bit group furnished to it. The overall association is such that when 2-bit groups ($x0_n$, $x1_n$) are successively applied to inputs 14 and 16, output phase values will be obtained which satisfy the condition according to the invention and explained in connection with FIG. 4.

Modulators which generate an eight phase signal in response to applied 3-bit groups in a given association are known per se and need not be described here (cf., e.g., U.S. Pat. Nos. 3,747,024 and 3,505,470; CCITT contribution COM. Sp. A. No. 143 (Oct. 1967); or W. R. Bennet, J. R. Davey: "Data Transmission," McGraw Hill, 1975, chapter 10).

A plain code conversion may be necessary for the 3-bit groups (1-to-1 substitution of the 3-bit groups in another sequence), in order to obtain the desired association as shown in FIG. 5.

Restoration of the transmitted bit sequence from the received signal values is achieved in the receiver in accordance with the method described in the above cited articles (Viterbi algorithm) and in accordance with the associations given by the coder/modulator. From a finite sequence of received signal values, that sequence which, with maximum likelihood, is the correct one is determined (in successive steps), and thus each time a decision is made for a received bit group.

A second embodiment of the invention is shown in FIGS. 6a, 6b and 7. In this embodiment the carrier can assume sixteen different discrete quadrature amplitude values (16 - QASK). For each possible value (or channel symbol) the real and imaginary parts are equal. A corresponding value array is shown in FIG. 6a. The "raster distance" between the points or complex values is equal to one unit.

Also in this embodiment, the coder can assume four states (according to the diagrams of FIGS. 2 and 3). The bit stream to be transmitted is divided, however, into 3-bit groups, and for each 3-bit group one QA-value is transmitted.

The complete set of all values (channel symbols) is also in this case subdivided into four subsets. Each subset, however, comprises four values (or channel symbols) in the present embodiment. Subset A, e.g., includes values P0, P4, P8 and P12. In FIG. 4a the subsets are characterized by circular lines. Groups are formed by pairs of subsets, i.e., A with B and C with D. In this embodiment the following is valid for the Euclidian distances: minimum distance of values within a subset (e.g., P0–P4): $d_{min\ I} = 2$; minimum distance within a group (e.g. P0–P2): $d_{min\ G} = \sqrt{2}$; minimum distance between any values (e.g., P0–P1): $d_{min\ M} = 1$.

The assignment between possible state transitions of the coder and subsets or carrier signal values is shown in FIG. 6b. The possible transitions are equal to those shown in FIGS. 2 and 4, also the assignment to the four subsets is equal. Since, however, in the second embodiment each subset comprises four values, four values can consequently be assigned to each transition. There are eight possibilities for representing the transition from any state to one of the two allowed follower states, and this is sufficient for distinguishing the 3-bit groups which are to be transmitted.

Also in this embodiment it is valid that the largest Euclidian minimum distances were selected for those values which are selectively used for the same transition (e.g., P0–P4, $d_{min\ I} = 2$), while the smallest minimum distances were selected for those values which cannot occur in the same situation (e.g., P0–P1, $d_{min\ M} = 1$).

FIG. 7 shows a block diagram of the coder/modulator for the second embodiment. Coder 10 has 3 inputs, 14a, 14b, and 16, and four outputs 18a, 18b, 20, and 22. The coder includes between input 16 and the outputs 20 and 22 a rate ½ coder 40 which is the same as the corresponding unit shown in FIG. 5. Between inputs 14a and 14b and 18a and 18b, respectively, there is a direct connection. Thus, the coder expands the 3-bit groups into 4-bit groups which in turn are applied to modulator 12. The modulator furnishes for each input group of four bits one QA value, the association being in accordance with the explanation given in connection with FIG. 6 and according to the representation in block 12 of FIG. 7, so that the desired Euclidian minimum distances are achieved.

A more detailed description of the modulator is not necessary since those devices for quadrature amplitude modulation are generally known.

Figure 8:
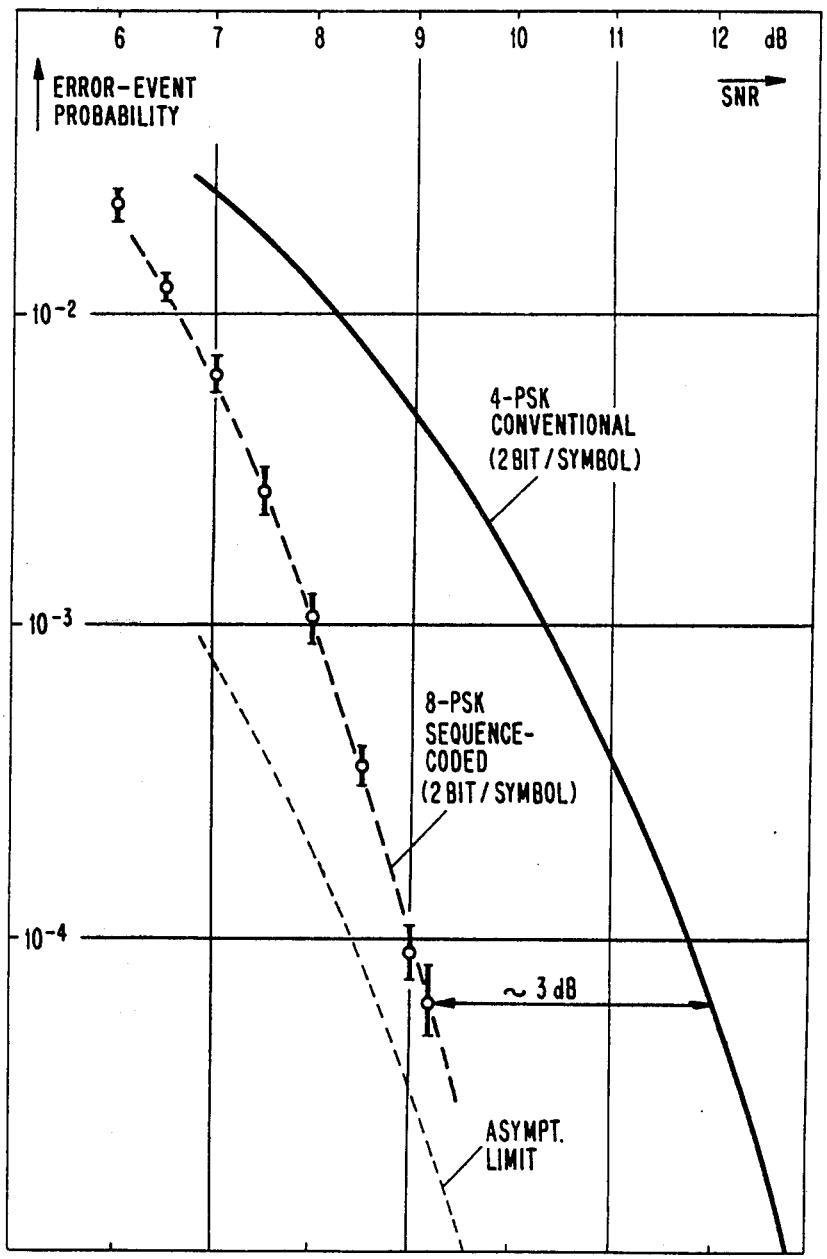
FIG. 8 is a diagram showing the characteristic of the error event probability over the signal-to-noise ratio, for normal four-phase modulation of 2-bit groups as well as for 8-phase modulation after sequential coding of 2-bit groups.

The combination of coding and modulation in accordance with the invention results in an improved error event probability at a given signal-to-noise ratio and a given modulation rate, in comparison to normal modulation. This is true despite the fact that the number of values used (channel symbols) is increased, which values are thereby located closer to each other and thus in principle would superficially appear to result in a higher error event probability. FIG. 8 shows corresponding curves for normal four-phase shift keying for transmission of 2 bits per symbol, and for eight-phase shift keying, in connection with sequence-coding according to the invention, also for transmission of 2 bits per symbol (in accordance with the first described embodiment). The curves which were obtained by simulation show that for a given error event probability a degradation of the signal-to-noise ratio amounting to about 3 dB can be tolerated. This fact is a considerable improvement which can be achieved with the aid of relatively simple means.

While the invention has been particularly shown and described with reference to preferred embodiments thereof, it will be understood by those skilled in the art that various changes in form and details may be made therein without departing from the spirit and scope of the invention.

What is claimed is:

1. A method for transmitting a bit sequence by modulating a carrier signal to sequentially assume one of a plurality of discrete signal values comprising the steps of:

subdividing the predetermined bit sequence into successive groups each containing $r$ sequential bits, expanding each $r$ bit group into a group of $r+1$ bits by a sequential coding process utilizing four internal states, selecting one out of $2^{r+1}$ discrete carrier signal values as a function of each $r+1$ expanded bit group, the selection being made so that $2^{r-1}$ carrier signal values correspond to each transition from one internal state of the coding process to one of two possible follower states and that the $2^{r-1}$ carrier signal values have a larger minimum distance from each other than the absolute minimum distance within the complete set of discrete carrier signal values, and transmitting the selected discrete carrier signal values in sequence.

2. The method according to claim 1 in which $2^r$ carrier signal values correspond to the transitions from any internal state to its two follower states and the $2^r$ carrier signal values are separated from each other by a minimum distance which is larger than the minimum distance within the complete set of $2^{r+1}$ carrier signal values, and the $2^{r-1}$ carrier signal values selected for a transition from an internal state to one of its two follower states are separated from each other by a larger distance than the distance between the other non-selected $2^{r-1}$ carrier signal values.

3. A modulation system for causing a carrier signal to assume one of a plurality of finite states as a function of the sequential application of a plurality of information bit signals comprising:

a sequential coder means including a plurality of terminals ($r$) for receiving in sequence $r$ bit groups of signals each said $r$ bit group having bits $x0_n, x1_n \ldots x(r-1)_n$, means responsive to the bits for providing coded bits according to the relations:

1) $y02_n = x0_n \oplus x0_{n-2}$, and

2) $y01_n = x0_n \oplus x0_{n-1} \oplus x0_{n-2}$, and

3) $y1_n = x1_n$, thru

4) $y(r-1)_n = x(r-1)_n$;

modulating means for modulating a carrier signal to assume in sequence one of $2^{r+1}$ discrete signal values in response to the output of the sequential coder means, the discrete signal values being separated from each other such that the complete set of signal values can be subdivided into two pairs of subsets (A, B and C, D), in which $$d_{min\,I} > d_{min\,G} > d_{min\,M}$$

where, $d_{min\,I}$ = minimum distance between signal values within a given subset, $d_{min\,G}$ = minimum distance between signal values within a pair of subsets, and $d_{min\,M}$ = minimum distance between signal values within the complete set, the connections between the sequential coder outputs and the modulator inputs being arranged so that the outputs $y01_n$ and $y02_n$ selects the subset of signal values and the remaining outputs associated with the bit group select the assigned signal value within the selected subset.

4. A modulation system as set forth in claim 3 in which the sequential coder means is provided with two input terminals for receiving two bit groups ($x1_n$ and $x0_n$) and three output terminals for furnishing three bit expanded output groups ($y1_n$, $y02_n$ and $y01_n$), said sequential coder including between one input terminal and two output terminals two serially connected one bit storage elements connected to said one input for storing bits $x0_{(n-1)}$ and $x0_{(n-2)}$, respectively, and two modulo two adders responsive to said ($x0_n, x0_{(n-2)}$) bits and $x0_n, x0_{(n-2)}, x0_{(n-1)}$ bits, respectively, and connected to two of said outputs, respectively, for providing at said outputs the $y01_n$ and $y02_n$ outputs; and said modulator being connected to said outputs from said sequential coder and furnishing in response to each applied three bit group ($y1_n, y02_n$ and $y01_n$) a phase-modulated carrier signal according to the relationship:

| $y1_n$ | $y02_n$ | $y01_n$ | Phase Values |
|---|---|---|---|
| 0 | 0 | 0 | P0 |
| 0 | 0 | 1 | P0 + f . π/4 |
| 0 | 1 | 1 | P0 + f . π/2 |
| 0 | 1 | 0 | P0 + f . 3π/4 |
| 1 | 0 | 0 | P0 + f . π |
| 1 | 0 | 1 | P0 + f . 5π/4 |
| 1 | 1 | 1 | P0 + f . 3π/2 |
| 1 | 1 | 0 | P0 + f . 7π/4 |

P0 being an arbitrary reference phase value, and $f$ being a predetermined value of either 1 or $-1$.

* * * * *